United States Patent
Takagaki et al.

(10) Patent No.: US 9,944,220 B2
(45) Date of Patent: Apr. 17, 2018

(54) VEHICLE HEADLIGHT CONTROL DEVICE

(71) Applicants: TOYOTA JIDOSHA KABUSHIKI KAISHA, Toyota-shi, Aichi-ken (JP); DENSO CORPORATION, Kariya-shi, Aichi-ken (JP); KOITO MANUFACTURING CO., LTD., Tokyo (JP)

(72) Inventors: Tatsuya Takagaki, Nisshin (JP); Ryu Mizuno, Kariya (JP); Kiyotaka Mochizuki, Shizuoka (JP)

(73) Assignees: TOYOTA JIDOSHA KABUSHIKI KAISHA, Toyota (JP); DENSO CORPORATION, Kariya-Shi (JP); KOITO MANUFACTURING CO., LTD., Tokyo (JP)

( * ) Notice: Subject to any disclaimer, the term of this patent is extended or adjusted under 35 U.S.C. 154(b) by 94 days.

(21) Appl. No.: 15/053,327

(22) Filed: Feb. 25, 2016

(65) Prior Publication Data

US 2016/0250964 A1    Sep. 1, 2016

(30) Foreign Application Priority Data

Feb. 27, 2015   (JP) .................................. 2015-038613

(51) Int. Cl.
*B60Q 1/08* (2006.01)
*B60Q 1/14* (2006.01)

(52) U.S. Cl.
CPC .............. *B60Q 1/08* (2013.01); *B60Q 1/143* (2013.01); *B60Q 2300/056* (2013.01); *B60Q 2300/41* (2013.01); *B60Q 2300/42* (2013.01)

(58) Field of Classification Search
CPC .... B60Q 1/08; B60Q 1/143; B60Q 2300/056; B60Q 2300/41; B60Q 2300/42
See application file for complete search history.

(56) References Cited

U.S. PATENT DOCUMENTS

| 8,979,334 B2 * | 3/2015 | Yamazaki | F21S 48/1784 362/465 |
| 2014/0355280 A1 * | 12/2014 | Fujiyoshi | B60Q 1/143 362/465 |

FOREIGN PATENT DOCUMENTS

| EP | 2116421 A2 | 11/2009 | |
| EP | 2 281 719 A1 | 2/2011 | |
| EP | 2281719 A1 * | 2/2011 | ........... B60Q 1/1423 |
| EP | 2 487 068 A2 | 8/2012 | |

(Continued)

*Primary Examiner* — Alan Cariaso
(74) *Attorney, Agent, or Firm* — Oliff PLC

(57) ABSTRACT

A vehicle headlight control device that controls a light distribution of headlight, includes: an obtaining section that obtains a distance from a driver's vehicle to a forward vehicle and the position of a forward vehicle; and a light distribution control section that changes the light distribution of the headlight based on the position of the forward vehicle, and set an illumination region, and a non-illumination region provided in a vicinity of the forward vehicle so as to include the forward vehicle and a margin distance from an end of a body of the forward vehicle. The light distribution control section determines a distance, in a vehicle width direction, between: a boundary between the illumination region and the non-illumination region; and each of left and right lateral ends of the forward vehicle, such that the greater the distance is, the less the distance in the vehicle width direction is.

8 Claims, 8 Drawing Sheets

(56) References Cited

FOREIGN PATENT DOCUMENTS

| EP | 2 786 898 A1 | | 10/2014 | |
|----|---|---|---|---|
| JP | 2009-269511 A | | 11/2009 | |
| JP | 2012166633 A | * | 9/2012 | ............ B60Q 1/143 |
| JP | 2014-168984 A | | 9/2014 | |
| JP | 2014-168985 A | | 9/2014 | |

* cited by examiner

PRIOR ART

VEHICLE HEADLIGHT CONTROL DEVICE

BACKGROUND OF THE INVENTION

Field of the Invention

The present invention relates to vehicle headlight control devices that control light distribution of headlight.

Description of the Background Art

A vehicle headlight control device has been known which performs a so-called light distribution control by detecting, in front of a driver's (user's) vehicle, another vehicle (forward vehicle such as a preceding vehicle or an oncoming vehicle) with the use of a camera or the like, and changing a region to be illuminated by a vehicle headlight (headlamp) based on the detection result. See, for example, Japanese Laid-Open Patent Publication No. 2014-168984, Japanese Laid-Open Patent Publication No. 2012-166633, and Japanese Laid-Open Patent Publication No. 2014-168985.

Such a vehicle headlight control device controls light distribution of the headlamp so as to reduce generation of uncomfortable glare (dazzling light) by which a driver of the forward vehicle is dazzled, and simultaneously assure, for a driver, a field of view in front of the driver' vehicle during driving at night. For example, light distribution of the headlamp is controlled such that a non-illumination region (or may be referred to as a light-shaded region) which is not illuminated by light is formed around the forward vehicle detected by the camera, and an illumination region which is other than the non-illumination region and is illuminated by light, is formed.

In the vehicle headlight control device that controls the light distribution, for example, deviation in illumination axis may occur due to variation in mounting of components (such as a sensor or a headlamp), or delay in light distribution control may occur due to variation in performance between the components. Therefore, in the conventional vehicle headlight control devices, in addition to light being blocked in a range corresponding to a width of the forward vehicle, no illumination region is set immediately lateral to the forward vehicle, and the illumination regions are set so as to be spaced, from the left and right lateral ends of the forward vehicle, by a predetermined distance (hereinafter, referred to as "margin distance") in the vehicle width direction. In the conventional vehicle headlight control devices, by the margin distance being provided, generation of uncomfortable glare on the forward vehicle due to the above-described variation is reduced. The margin distance may be represented as a margin angle.

However, in the conventional vehicle headlight control devices, the margin distances that are set from the left and the right lateral ends of the forward vehicle are constant in width regardless of a distance between the driver's vehicle and the forward vehicle. That is, both in the case of the forward vehicle being close to the driver's vehicle and in the case of the forward vehicle being distant from the driver's vehicle, the margin distances from the illumination regions to the left and the right lateral ends of the forward vehicle are the same.

In the illumination region having been thus set, as shown in FIG. 8A, a ratio (m/W1) of a margin distance m for each of the left and the right sides relative to a vehicle width W1 of a forward vehicle 201 is reduced when the forward vehicle 201 is close to the driver's vehicle. Therefore, for example, a person 202 near the forward vehicle 201 can be illuminated, whereby visibility in front of the driver's vehicle is good. However, as shown in FIG. 8B, a ratio (m/W2) of a margin distance m for each of the left and the right sides relative to a vehicle width W2 of a forward vehicle 203 is increased when the forward vehicle 203 is distant from the driver's vehicle. Accordingly, in this case, for example, a person 204 near the forward vehicle 203 is not illuminated at all or not sufficiently illuminated, whereby visibility in front of the driver's vehicle becomes worse.

SUMMARY OF THE INVENTION

The present invention is made in view of the above-mentioned problem, and an object of the present invention is to provide a vehicle headlight control device that controls light distribution of headlight based on a distance from a driver's vehicle to a forward vehicle, to enable improvement of visibility in front of the driver's vehicle.

In order to solve the above problem, a first invention of the present disclosure is directed to a vehicle headlight control device that controls a light distribution of headlight. The vehicle headlight control device includes: an obtaining section configured to obtain a position of a forward vehicle in front of a driver's vehicle, and a distance from the driver's vehicle to the forward vehicle; and a light distribution control section configured to change the light distribution of the headlight based on the position of the forward vehicle, and set an illumination region and a non-illumination region, the non-illumination region being provided in a vicinity of the forward vehicle so as to include the forward vehicle, the non-illumination region including a predetermined distance set from an end of a body of the forward vehicle. The light distribution control section determines a distance, in a vehicle width direction, between: a boundary between the illumination region and the non-illumination region; and each of left and right lateral ends of the forward vehicle, such that the greater the distance from the driver's vehicle to the forward vehicle is, the less the distance in the vehicle width direction is.

In the vehicle headlight control device according to the first invention, the obtained distance from the driver's vehicle to the forward vehicle is used for the light distribution control of the headlight. In the light distribution control, in order to set the non-illumination region that is in the vicinity of the forward vehicle, includes the forward vehicle, and includes the predetermined distance (margin distance) from the end of the vehicle body, a distance, in the vehicle width direction, between: a boundary between the illumination region and the non-illumination region; and each of the left and the right lateral ends of the forward vehicle, is determined based on the distance between the vehicles. For example, the margin distance is gradually reduced such that the greater the distance between the vehicles is, the less the margin distance is. Thus, in a case where the light distribution control is performed for the forward vehicle that is distant form the driver's vehicle during driving at night, a field of view in front of the driver's vehicle that is distant from the forward vehicle can be enlarged, and visibility in front of the driver's vehicle can be improved.

Further, in a second invention according to the present disclosure, the light distribution control section determines the distance in the vehicle width direction such that an amount of light estimated to be received by the forward vehicle becomes less than or equal to an amount of light in which an amount of glare is allowable for the forward vehicle which is distant by the distance from the driver's vehicle to the forward vehicle.

In the vehicle headlight control device according to the second invention, the margin distance is determined also based on an amount of light received by the forward vehicle.

An amount of light received by the forward vehicle can be estimated based on, for example, the information associated with the forward vehicle (such as a distance from the driver's vehicle to the forward vehicle). Therefore, the margin distance is determined such that an amount of light received by (a driver of) the forward vehicle due to light emitted from the headlamp of the driver's vehicle is less than or equal to an amount of light in which an amount of glare is allowable for the forward vehicle. Thus, during driving at night, a field of view in front of the driver's vehicle that is distant from the forward vehicle can be enlarged and visibility in front of the driver's vehicle can be improved such that the driver of the forward vehicle does not feel uncomfortable glare.

Further, in a third invention according to the present disclosure, the obtaining section further obtains vehicle information indicating whether the forward vehicle is a preceding vehicle or an oncoming vehicle, and the light distribution control section determines the margin distance based further on the vehicle information.

In the vehicle headlight control device according to the third invention, the margin distance is determined also based on whether the forward vehicle is a preceding vehicle or an oncoming vehicle. In general, the light of the headlamp is felt more dazzling by a driver of an oncoming vehicle than a driver of a preceding vehicle. Therefore, for example, when the forward vehicle is an oncoming vehicle, the margin distance is enlarged. Thus, the driver of the oncoming vehicle is less likely to feel dazzling.

Further, in a fourth invention according to the present disclosure, the obtaining section further obtains a relative positional deviation in the vehicle width direction between an axis of the driver's vehicle in a traveling direction and an axis of the forward vehicle in a traveling direction, and the light distribution control section determines the margin distance based further on the relative positional deviation therebetween.

In the vehicle headlight control device according to the fourth invention, the margin distance is determined also based on a relative positional deviation between the driver's vehicle and the forward vehicle. In general, an amount of light of the headlamp is increased in an illumination range (near the center axis of the driver's vehicle) in which light of the left front headlamp and light of the right front headlamp overlap each other. Therefore, for example, when a relative positional deviation between the driver's vehicle and the forward vehicle is small, the margin distance is increased. Thus, the driver of the oncoming vehicle is less likely to feel dazzling.

Further, in a fifth invention according to the present disclosure, the light distribution control section further determines a distance, in a vehicle height direction, between: a boundary between the illumination region and the non-illumination region; and each of upper and lower ends of the forward vehicle, such that the greater the distance from the driver's vehicle to the forward vehicle is, the less the distance in the vehicle height direction is.

In the vehicle headlight control device of the fifth invention, the light distribution control section performs the light distribution control for the margin distance to be set in the vehicle height direction from each of the upper and the lower ends of the forward vehicle. Thus, visibility, in front of the driver's vehicle, for, for example, road signs and guide sign boards at high positions, can be further improved.

As described above, the vehicle headlight control device according to the present invention controls light distribution of headlight based on a distance from a driver's vehicle to a forward vehicle. Thus, visibility in front of the driver's vehicle can be improved.

These and other objects, features, aspects and advantages of the present invention will become more apparent from the following detailed description of the present invention when taken in conjunction with the accompanying drawings.

DESCRIPTION OF THE PREFERRED EMBODIMENTS

[Outline]

A vehicle headlight control device according to the present invention performs light distribution control of headlight (headlamp) based on a distance from a driver's (user's) vehicle to a forward vehicle. In the light distribution control, when an illumination region is set outside the forward vehicle, a margin distance is set based on the distance between the vehicles. The margin distance is a distance from an edge (that is, a boundary between the illumination region and a non-illumination region) of the illumination region to the end of a body of the forward vehicle. When the forward vehicle is close to the driver's vehicle, the margin distance is increased. When the forward vehicle is distant from the driver's vehicle, the margin distance is reduced. Thus, in a case where the light distribution control is performed for the forward vehicle distant from the driver's vehicle during driving at night, a field of view in front of the driver's vehicle that is distant form the forward vehicle is enlarged, and visibility in front of the driver's vehicle can be improved.

Description of Embodiment

Hereinafter, an embodiment of a vehicle headlight control device according to the present invention will be sequentially described with reference to the drawings.

1. Example of Configuration of Vehicle Headlight Control Device

Figure 1:
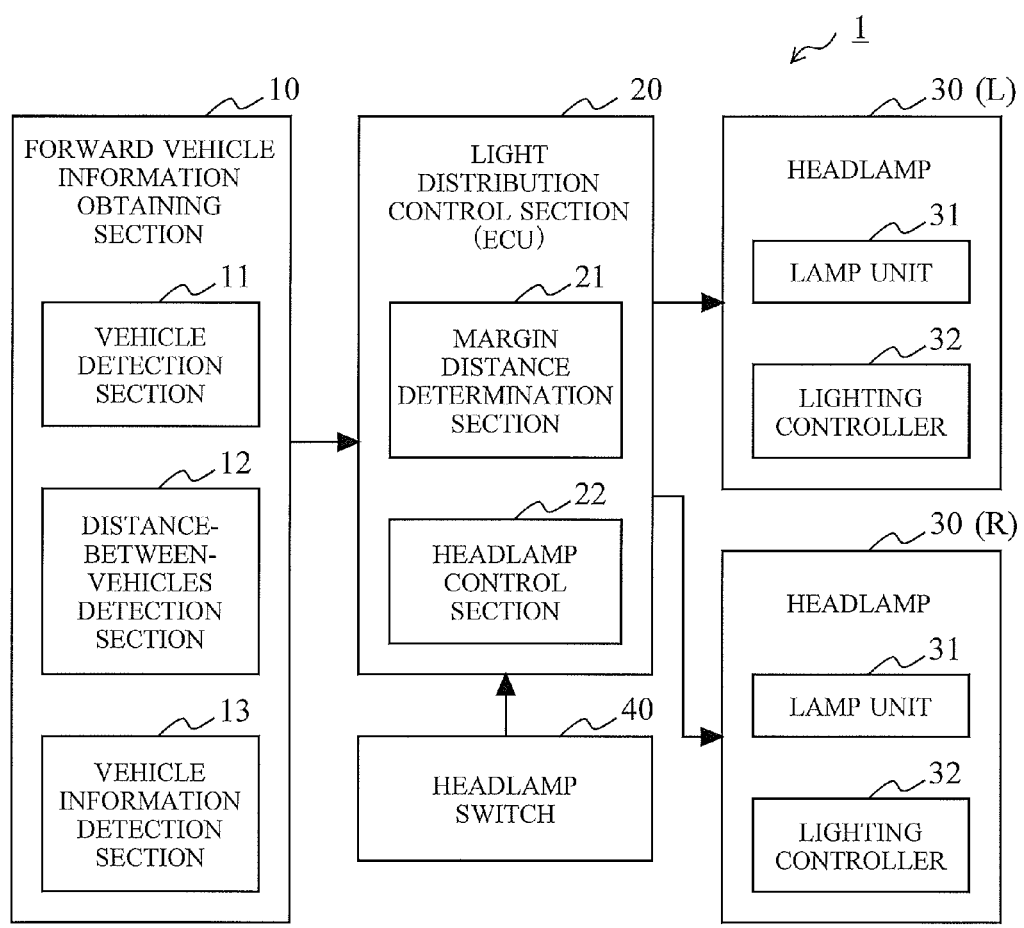
FIG. 1 illustrates an example of a schematic configuration of a vehicle headlight control device according to an embodiment of the present invention.

FIG. 1 schematically illustrates a configuration of a vehicle headlight control device 1 according to one embodiment of the present invention. In FIG. 1, the vehicle headlight control device 1 according to the present embodiment includes a forward vehicle information obtaining section 10, a light distribution control section 20, a headlamp 30 (L, R), and a headlamp switch 40. Firstly, the components of the vehicle headlight control device 1 according to the present embodiment will be described.

1-1. Forward Vehicle Information Obtaining Section 10

The forward vehicle information obtaining section 10 detects another vehicle (hereinafter, referred to as "forward vehicle") in front of the driver's vehicle, and obtains information associated with the forward vehicle. The forward vehicle includes, for example, a preceding vehicle which travels in the same direction as a direction in which the driver's vehicle travels, and an oncoming vehicle which travels in a direction opposite to the direction in which the driver's vehicle travels. The forward vehicle information obtaining section 10 includes a vehicle detection section 11, a distance-between-vehicles detection section 12, and a vehicle information detection section 13.

The vehicle detection section 11 detects a position of the forward vehicle. The position of the forward vehicle includes a coordinate representing a position of the forward vehicle in a predetermined coordinate system, a lateral width of the forward vehicle, and the like. Further, the vehicle detection section 11 may detect a relative positional deviation in a vehicle width direction between an axis of the forward vehicle in the traveling direction, and an axis of the driver's vehicle in the traveling direction. For example, a camera (not shown) having an image sensor is used for detecting a position of the forward vehicle and a positional deviation of the forward vehicle. Examples of the image sensor include a CCD (Charge-Coupled Device) sensor and a CMOS (Complementary Metal Oxide Semiconductor) sensor. The image sensor is placed, for example, in a front portion of a vehicle body or in a cabin of the vehicle such that an imaging surface is oriented in a vehicle traveling direction, and takes an image of a region in front of and in the vicinity of the vehicle. The image sensor is placed at, for example, such a position (at the upper portion of a windshield, or behind a rear-view mirror) that the image sensor does not hinder the driver from driving the vehicle. The vehicle detection section 11 detects a position of the forward vehicle or positional deviation of the forward vehicle, based on the image taken by the image sensor. The position of the forward vehicle or the positional deviation of the forward vehicle, which are detected by the vehicle detection section 11, are outputted to the light distribution control section 20.

The distance-between-vehicles detection section 12 detects a relative distance between the driver's vehicle and the forward vehicle, that is, a distance from the driver's vehicle to the forward vehicle. For example, a radar sensor (not shown) is used for detecting the distance between the vehicles. Examples of the radar sensor include a laser radar, a microwave radar, a millimeter wave radar, or a ultrasonic radar. The radar sensor is placed, for example, in a front portion of the vehicle body or in the cabin of the vehicle such that a surface on which electromagnetic wave is received and transmitted is oriented in the vehicle traveling direction, and radiates electromagnetic wave forward from the vehicle or receives electromagnetic wave transmitted from the front of the vehicle. Specifically, the radar sensor radiates electromagnetic wave toward a region in front of and in the vicinity of the driver's vehicle, and receives the electromagnetic wave reflected by and returned from the forward vehicle. The distance-between-vehicles detection section 12 detects a distance from the driver's vehicle to the forward vehicle based on the result of the reception and transmission of the electromagnetic wave by the radar sensor. The distance between the vehicles having been detected by the distance-between-vehicles detection section 12 is outputted to the light distribution control section 20.

In order to detect a distance between the vehicles, a stereocamera capable of obtaining two images of the same forward vehicle taken by using two different points of view, as well as a radar sensor using electromagnetic wave, can be used. In this case, a distance from the driver's vehicle to the forward vehicle can be detected based on a parallax between the two images.

The vehicle information detection section 13 detects vehicle information associated with a state and/or characteristics of the forward vehicle. Examples of the vehicle information include information indicating whether the forward vehicle is a preceding vehicle that travels in the same direction as the direction in which the driver's vehicle travels, or an oncoming vehicle that travels in a direction opposite to the direction in which the driver's vehicle travels. In order to detect whether the forward vehicle is a preceding vehicle or an oncoming vehicle, for example, an image taken by the camera used for the vehicle detection section 11 can be used. For example, when the preceding vehicle is seen from the driver's vehicle, light of red tail lamps in which an amount of light is low can be detected, whereas when the oncoming vehicle is seen from the driver's vehicle, light of white headlamps in which an amount of light is high can be detected. Whether the forward vehicle is a preceding vehicle or an oncoming vehicle can be determined by identifying color or brightness in the taken image.

Further, the vehicle information may include information representing a type of the forward vehicle, for example, information indicating whether the forward vehicle is a small vehicle, a large vehicle, or a two-wheeled automotive vehicle. For example, an image taken by the camera used for the vehicle detection section 11 can be used also for detecting a type of the forward vehicle. For example, when the preceding vehicle is seen from the driver's vehicle, a distance between light of a left tail lamp and light of a right tail lamp, and/or the number of the tail lamps emitting light are detected, and when the oncoming vehicle is seen from the driver's vehicle, a distance between light of a left headlamp and light of a right headlamp, and/or the number of the headlamps emitting light are detected, whereby whether the forward vehicle is a small vehicle, a large vehicle, or a two-wheeled automotive vehicle can be detected.

The camera, the sensor, or the like used for the forward vehicle information obtaining section 10 described above, may be mounted to the vehicle so as to be dedicated for controlling the headlight, or may double as a camera, a sensor, or the like which is used for a system, mounted to the vehicle, such as a traveling lane keeping system or a brake assist system. The image taken by the image sensor may be a color image or a monochrome image.

Further, in the configuration shown in FIG. 1, the forward vehicle information obtaining section 10 includes the vehicle detection section 11, the distance-between-vehicles detection section 12, and the vehicle information detection section 13. However, the configuration shown in FIG. 1 is an exemplary configuration, and, for example, the vehicle information detection section 13 may not be included in the configuration shown in FIG. 1 when the vehicle information need not be used for determining a margin distance in the light distribution control for the headlamp 30 as described below.

1-2. Light Distribution Control Section 20

The light distribution control section 20 controls light distribution of high beams by the headlamp 30 based on the information of the forward vehicle detected by the forward vehicle information obtaining section 10, according to an instruction from a driver through the headlamp switch 40. Specifically, the light distribution control section 20 controls the light distribution of the headlamp 30 such that, within a range which can be illuminated by high beams of the headlamp 30, a range that does not include the forward vehicle detected by the forward vehicle information obtaining section 10 is set as an illumination region to be illuminated by light. In other words, the light distribution control section 20 controls the light distribution of the headlamp 30 such that a range that is in the vicinity of the forward vehicle and includes the forward vehicle detected by the forward vehicle detection section 10, is set as a non-illumination region which is not illuminated by light. The light distribution control section 20 includes a margin distance determination section 21 and a headlamp control section 22.

The margin distance determination section 21 obtains, from the forward vehicle information obtaining section 10, a position of the forward vehicle, a distance from the driver's vehicle to the forward vehicle, and the vehicle information of the forward vehicle. The margin distance determination section 21 determines a margin distance (margin angle) based on at least the position of the forward vehicle and the distance between the vehicles. The margin distance is a distance from a boundary between the illumination region and the non-illumination region, to the end of the body of the forward vehicle, as described above. For example, the margin distance is a distance from each of the left and the right lateral ends of the forward vehicle in the vehicle width direction. A method for determining the margin distance will be described below. The margin distance determination section 21 may determine the margin distance based on the vehicle information in addition to the distance between the vehicles. Further, the margin distance determination section 21 may determine the margin distance in further consideration of a relative positional deviation in the vehicle width direction between an axis of the driver's vehicle in the traveling direction and an axis of the forward vehicle in the traveling direction.

The headlamp control section 22 issues, to the headlamp 30, instructions necessary for setting, for the forward vehicle for which the light distribution is to be controlled, the illumination region and the non-illumination region having the margin distance determined by the margin distance determination section 21. The necessary instructions depend on the configuration of the headlamp 30. For example, when the headlamp 30 is configured such that a plurality of lamps that emit light in different directions, are lit up/extinguished, to change the illumination region and the non-illumination region, the number and the positions of the lamps to be lit up or extinguished are designated. For example, when the headlamp 30 is configured such that a portion of emitted light is blocked by using a shade mechanism provided in the front portion of the lamp to change the illumination region and the non-illumination region, a moving distance of the shade mechanism, a swiveling distance of the lamp, or the like are designated.

The light distribution control section 20 described above is typically an electronic control unit (ECU) that includes, for example, a central processing unit (CPU), a memory, and an input/output interface (which are not shown). The light distribution control section 20 functions as the margin distance determination section 21 and the headlamp control section 22 described above, by the CPU reading, interpreting, and executing a program stored in the memory.

1-3. Headlamp 30

The headlamp 30 is implemented as a pair of headlights that are mounted on the right and the left sides of the vehicle, and illuminate a region in front of the vehicle. A left front headlamp 30 (L) and a right front headlamp 30 (R) basically having the same structure, are disposed so as to be bilaterally symmetric. Each headlamp 30 includes a lamp unit 31 and a lighting controller 32 in, for example, a lamp chamber formed by a lamp cover (not shown) through which light is transmitted, and a lamp housing (not shown).

Figure 2:
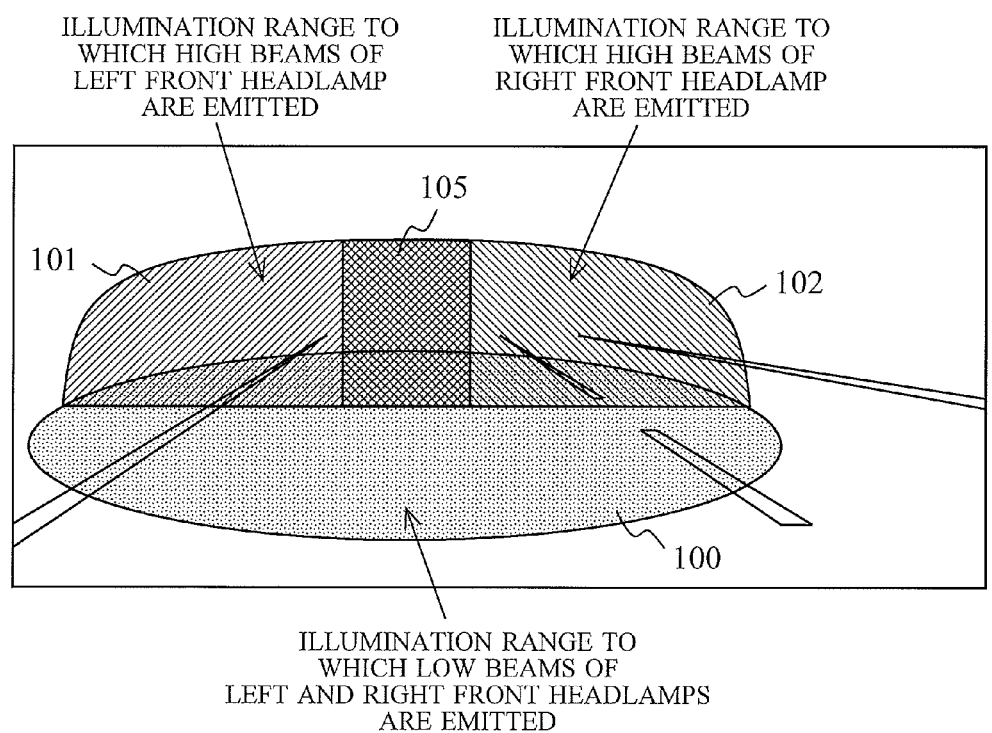
FIG. 2 illustrates examples of an illumination range by low beams and an illumination range by high beams, the illumination ranges being formed in front of a vehicle by a headlamp.

The lamp unit 31 includes a light source such as a halogen lamp, an HID (High Intensity Discharge) lamp, or a LED (Light Emitting Diode) lamp. The lamp unit 31 emits light from the lamp to form, in front of the vehicle, an illumination range 100 to which low beams are emitted, and illumination ranges 101 and 102 to which high beams are emitted, as shown in FIG. 2. In FIG. 2, both the illumination range 101 by the left front headlamp 30 (L) and the illumination range 102 by the right front headlamp 30 (R) are indicated for high beam emission, while the one illumination range 100 is indicated for low beam emission, for simplicity.

The lamp unit 31 may include a lamp for low beam emission and a lamp for high beam emission, which are independent of each other, or a lamp that doubles in performing both low beam emission and high beam emission. The number of lamps is not limited to any specific number, and, for example, the lamp may be implemented as a LED array having one array of a plurality of LED lamps or a plurality of arrays each including a plurality of LED lamps.

The lighting controller 32 controls lighting state of the lamp unit 31 based on the instructions from the light distribution control section 20, to change the non-illumination region and the illumination region to be set in the high beam illumination ranges 101 and 102. Specifically, the lighting controllers 32 controls the lighting states of the headlamps 30 on the left and the right sides in an independent manner such that the illumination region and the non-illumination region having the margin distance determined by the light distribution control section 20 based on the information of the forward vehicle, are set in front of the driver's vehicle according to the position of the forward vehicle.

For example, when the headlamp 30 has a LED array including a plurality of LED lamps, the lighting controller 32 is a switching mechanism (such as a relay) that individually switches power conduction of each of the plurality of LED lamps. For example, when the headlamp 30 has an HID lamp and a lamp shade, the lighting controller 32 is an actuator mechanism (such as a drive motor) for moving the lamp shade.

1-4. Headlamp Switch 40

The headlamp switch 40 is an operation switch that switches the headlamp 30 between on and off, switches between high beam emission and low beam emission, and controls whether or not the light distribution control for high beams is to be performed. The headlamp switch 40 is disposed at an appropriate position in the cabin, for example, at a steering column. The light distribution control for high beams may be automatically performed in conjunction with the headlamp 30 being lit up, or may be automatically performed in conjunction with switching to high beam emission.

2. Light Distribution Control Performed by Vehicle Headlamp Control Device

Next, the light distribution control, for high beams, which is performed for the headlamp 30 by the light distribution control section 20, based on the information of the forward vehicle detected by the forward vehicle information obtaining section 10, will be described with further reference to FIG. 3A, FIG. 3B, and FIG. 4.

2-1. Method for Determining Margin Distance

Figure 8A:
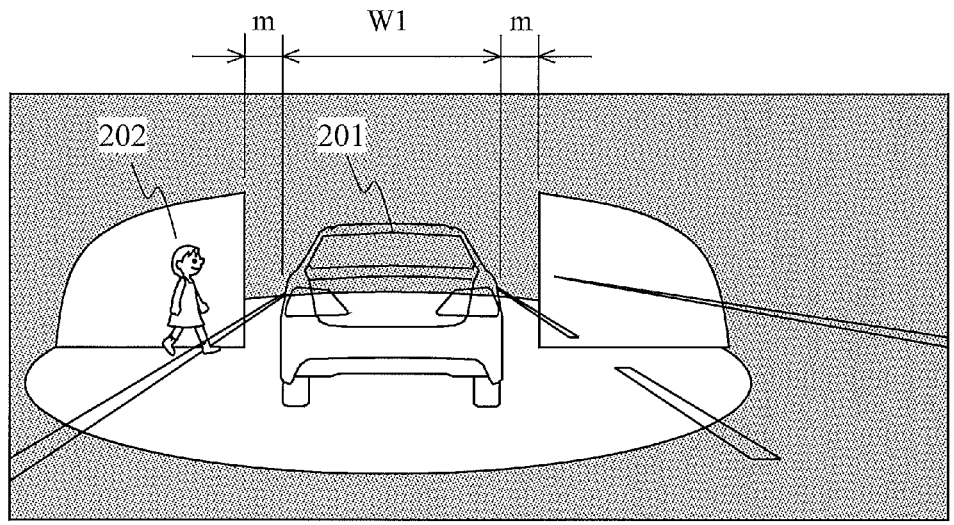
FIGS. 8A and 8B illustrate examples of an illumination region and a non-illumination region formed in light distribution control by a conventional vehicle headlight control device.
Figure 8B:
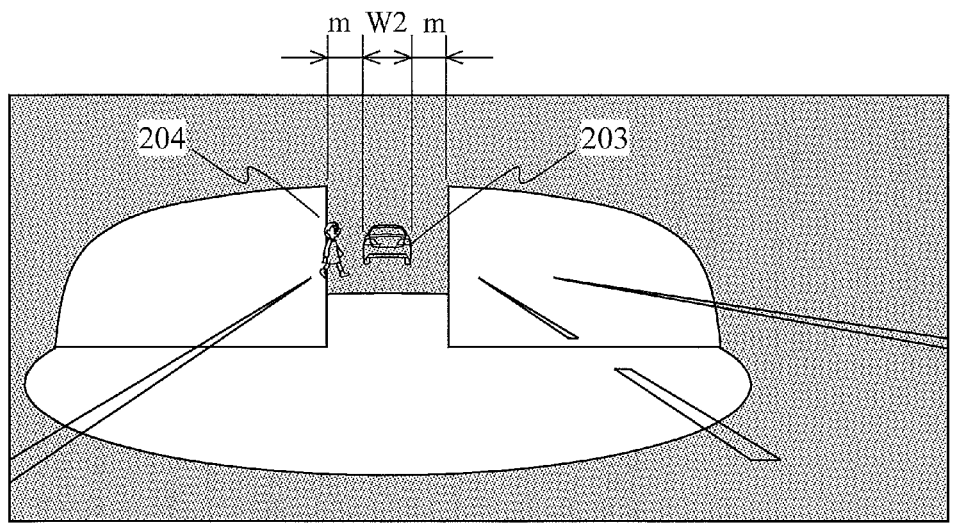

In the light distribution control using a constant margin distance as described above in BACKGROUND OF THE INVENTION, as shown in FIG. 8A and FIG. 8B, the ratio (m/W2) of the margin distance m on each of the left and right sides relative to the vehicle width W2 of the forward vehicle 203 in the case of the light distribution control being performed for the forward vehicle 203 that is distant from the driver's vehicle, is greater than the ratio (m/W1) of the margin distance m on each of the left and right sides relative to the vehicle width W1 of the forward vehicle 201 in the case of the light distribution control being performed for the forward vehicle 201 that is close to the driver's vehicle. Therefore, for example, the person 204 near the forward vehicle 203 that is distant from the driver's vehicle cannot be illuminated at all, or cannot be sufficiently illuminated. Therefore, when the light distribution control is performed for the forward vehicle which is distant from the driver's vehicle, visibility in front of the driver's vehicle and in the vicinity of the forward vehicle distant from the driver's vehicle is poor.

In order to solve the above problem, in the present invention, the margin distance is controlled so as to be changed based on the information of the forward vehicle. In the basic control, the margin distance is determined based on the distance from the driver's vehicle to the forward vehicle. For example, the left and the right margin distances are gradually reduced such that the greater the distance from the driver's vehicle to the forward vehicle is, the less each of the left and the right margin distances is. In the example shown in FIG. 3A and FIG. 3B, a margin distance m2 set in the case of the light distribution control being performed for the forward vehicle 203 that is distant from the driver's vehicle by a distance d2, is less than a margin distance m1 set in the case of the light distribution control being performed for the forward vehicle 201 that is distant from the driver's vehicle by a distance d1 (<d2) (m1>m2). In this control, even in a case where the light distribution control is performed for the forward vehicle 203 that is distant from the driver's vehicle (FIG. 3B), a ratio (m2/W2) of a margin distance m2 on each of the left and the right sides relative to the vehicle width W2 of the forward vehicle 203 can be less than a ratio of a margin distance on each of the left and the right sides relative to the vehicle width in the case of the light distribution control being performed for the forward vehicle 201 that is close to the driver's vehicle (FIG. 3A). Therefore, in a case where the light distribution control is performed for the forward vehicle that is distant from the driver's vehicle, visibility in a range in front of and distant from the driver's vehicle can be improved.

Further, in order to determine the margin distance based on the distance from the driver's vehicle to the forward vehicle with enhanced accuracy, the vehicle information associated with a state and/or characteristics of the forward vehicle may be used. The vehicle information indicates, for example, whether the forward vehicle is a preceding vehicle or an oncoming vehicle. In order to further improve an accuracy for determining the margin distance, a relative positional deviation in the vehicle width direction between an axis of the driver's vehicle in the traveling direction and an axis of the forward vehicle in the traveling direction may be used.

Further, the margin distance may be determined based on a distance from the driver's vehicle to the forward vehicle, in consideration of whether or not uncomfortable glare (dazzling light) by which a driver of the forward vehicle is dazzled is generated due to the light emitted from the headlamp 30 of the driver's vehicle. For example, a value of distance may be determined such that the greater the distance between the vehicles is, the less the margin distance is, such that generation of glare uncomfortable for a driver of the forward vehicle is prevented. In the present embodiment, in order to prevent generation of uncomfortable glare (dazzling light) by which the driver of the forward vehicle is dazzled, an amount of light (for example, an amount of light measured at a position of a driver of the forward vehicle) received by the forward vehicle due to light emitted to the illumination region is estimated. The amount of light received by the forward vehicle can be estimated based on a relationship, between the driver's vehicle and the forward vehicle, associated with change of the amount of light (described below).

How a driver feels the glare depends on an amount of light incident on his/her pupils. If ten thousand people feel the glare in the same way (without individual difference), an amount of light at which the driver starts to feel that the glare is uncomfortable, can be defined as a constant value. Therefore, if the amount of light that is estimated to be received by the driver of the forward vehicle is less than or equal to a limit value at which the driver starts to feel uncomfortable glare, that is, less than or equal to an amount of light in which an amount of glare is allowable, the driver of the forward vehicle can be prevented from feeling uncomfortable glare.

a. Estimation of Amount of Light Received by Forward Vehicle

The margin distance determination section 21 of the light distribution control section 20 can estimate an amount of glare received by the forward vehicle based on the relationship between the driver's vehicle and the forward vehicle. Specifically, the margin distance determination section 21 can estimate an amount of light received by the forward vehicle, based on a position of the forward vehicle, a distance from the driver's vehicle to the forward vehicle, and the vehicle information of the forward vehicle, which are obtained from the forward vehicle information obtaining section 10.

The greater the distance from the light source is, the lower an amount of light received from the light source is. That is, the greater the distance from the driver's vehicle is, the less an amount of high beams emitted by the headlamp 30 of the driver's vehicle is (in general, the amount of high beams is reduced so as to be inversely proportional to the square of the distance). Therefore, based on this phenomenon, an amount of light received by the forward vehicle due to light emitted to the illumination region can be estimated.

For example, when Lo represents an amount of high beams emitted from the headlamp 30 of the driver's vehicle, and a function indicating an attenuation rate of an amount of light based on the distance d between the vehicles is represented as f(d) (0<f(d)<1), an amount L of light received by the forward vehicle can be represented as "L=Lo×f(d)". Therefore, the greater the distance d between the vehicles is and the farther the forward vehicle is from the driver's vehicle, the less the value of the function f(d) is and the lower the amount L of light received by the forward vehicle is.

Further, an amount of light received from the light source is reduced each time the light is reflected by a mirror, or the light is transmitted through and refracted by a glass. For example, (a driver of) an oncoming vehicle receives high beams emitted from the headlamp 30 of the driver's vehicle by the light being once transmitted through a windshield. Meanwhile, (a driver of) a preceding vehicle receives high beams emitted from the headlamp 30 of the driver's vehicle by the light being twice reflected by and/or transmitted through/refracted by a door mirror and a door glass (or a rear window glass and a rear-view mirror). That is, an amount of light received by the preceding vehicle from the headlamp 30 of the driver's vehicle is less than an amount of light received by an oncoming vehicle. Therefore, based on this phenomenon, an amount of light received by the forward vehicle due to light emitted to the illumination region can be estimated in more detail.

For example, when Lo represents an amount of high beams emitted from the headlamp 30 of the driver's vehicle, and a coefficient representing an attenuation rate of an amount of light for a preceding vehicle a, is represented by Ca (0<Ca<1), an amount L of light received by the preceding vehicle can be represented as "L=Lo×Ca". Therefore, the amount L of light received by the preceding vehicle is less than an amount of light received by the oncoming vehicle.

Further, a pair of the headlamps 30 provided on the left and the right sides of the vehicle, emit light to a region in front of the vehicle. Therefore, in general, as shown in FIG. 2, the illumination range 101 to which the high beams of the left front headlamp 30 (L) are emitted, and the illumination range 102 to which the high beams of the right front headlamp 30 (R) are emitted overlap each other, and an amount of light is increased in an overlapping illumination range 105. That is, at a position that is distant from the center axis of the driver's vehicle by a predetermined distance and shorter distance in the width direction, an amount of light is higher than an amount of light in other positions, and uncomfortable glare is more likely to be generated. Therefore, based on the fact, an amount of light received by the forward vehicle due to the light emitted to the illumination region can be estimated in more detail.

For example, when Lo represents an amount of high beams emitted from the headlamp 30 of the driver's vehicle, and a function representing an attenuation rate of an amount of light based on a relative positional deviation s in the vehicle width direction between an axis of the driver's vehicle in the traveling direction and an axis of the forward vehicle in the traveling direction is represented as f(s) (0<f(s)≤1), an amount L of light received by the forward vehicle can be represented as "L=Lo×f(s)". Therefore, the greater the relative positional deviation s therebetween is and the farther the forward vehicle is from the driver's vehicle, the less a value of the function f(s) is and the less the amount L of light received by the forward vehicle is. The relative positional deviation in the vehicle width direction between an axis of an oncoming vehicle in the traveling direction and an axis of the driver's vehicle in the traveling direction is great in general, and the function f(s) may not be applied.

In the above example, an amount of light received by the forward vehicle is estimated by determining all of: a distance from the driver's vehicle to the forward vehicle; the vehicle information of the forward vehicle; and a relative positional deviation in the vehicle width direction between an axis of the driver's vehicle in the traveling direction and an axis of the forward vehicle in the traveling direction. However, an amount of light received by the forward vehicle can be estimated by determining only a distance from the driver's vehicle to the forward vehicle. The vehicle information of the forward vehicle, or a relative positional deviation in the vehicle width direction between an axis of the driver's vehicle in the traveling direction and an axis of the forward vehicle in the traveling direction may be determined as appropriate in order to enhance an accuracy for estimating an amount of light received by the forward vehicle.

In the above example, the margin distance determination section 21 estimates an amount of light received by the forward vehicle. However, an amount of light received by the forward vehicle may not be actually estimated while the vehicle is actually traveling. For example, data associated with a relationship between the margin distance, and a distance between the vehicles at which an amount of light estimated to be received by the forward vehicle is less than or equal to an allowable amount of light, is previously calculated, by simulation or the like, for various distances between vehicles, various vehicle information, and various relative positional deviations of the forward vehicle. The previously calculated data is stored in a memory (not shown) or the like. Thus, the margin distance determination section 21 can determine the margin distance corresponding to a distance, from the driver's vehicle to the forward vehicle, which is obtained from the forward vehicle information obtaining section 10, with reference to the stored data.

b. Calculation of Margin Distance

The margin distance determination section 21 obtains a margin distance, for the forward vehicle detected by the forward vehicle information obtaining section 10, at which an amount of light that is estimated in the above manner and received by the forward vehicle is less than or equal to an amount of light in which an amount of glare is allowable for the forward vehicle. The margin distance may be obtained in, for example, the following manner.

When an amount of light received by the forward vehicle is estimated, an amount of light received by the forward vehicle is sequentially estimated based on the information associated with the forward vehicle while the margin distance is gradually increased from zero. A margin distance at which the estimated amount of light becomes less than or equal to the limit value, that is, at which an amount of light received by the forward vehicle becomes less than or equal to an amount of light in which an amount of glare is allowable, is determined. The determined margin distance is set as the margin distance for the illumination region and the non-illumination region to be set for the forward vehicle.

Alternatively, when an amount of light received by the forward vehicle is not estimated, the light distribution control characteristics (for example, FIG. 4) associated with a relationship between: the margin distance; and the distance between the vehicles at which an amount of light received by the forward vehicle is less than or equal to an amount of light in which an amount of glare is allowable, is previously stored in a not-illustrated memory or the like. The margin distance corresponding to the distance, between the vehicles, which is detected by the forward vehicle information obtaining section 10 is determined based on the light distribution control characteristics. The determined margin distance is set as the margin distance for the illumination region and the non-illumination region to be set for the forward vehicle.

The above examples are merely exemplary manners for determining the margin distance. Therefore, the margin distance may be determined in another manner. Further, the margin distances set from a boundary between the illumination region and the non-illumination region to the end of the body of the forward vehicle may be set as the same value regardless of a position of the body of the vehicle, or may be set as different values. For example, the margin distance set for the left lateral end of the forward vehicle and the margin distance set for the right lateral end of the forward vehicle may be set as different values, respectively.

c. Setting of Illumination Region and Non-Illumination Region

When the margin distance has been determined by the margin distance determination section 21, the headlamp control section 22 sets the illumination region and the non-illumination region based on the margin distance. For example, the headlamp control section 22 adds the determined margin distance at the left and the right lateral ends of the forward vehicle which are obtained from a position (coordinate and the vehicle width) of the forward vehicle detected by the forward vehicle information obtaining section 10. The headlamp control section 22 sets, as the non-illumination region, a range between a position which is distant, by the margin distance, from the left lateral end of the forward vehicle in the leftward direction and a position which is distant, by the margin distance, from the right lateral end of the forward vehicle in the rightward direction. That is, the non-illumination region having the margin distance is set around the forward vehicle. The headlamp control section 22 sets, as the illumination region, a region other than the non-illumination region.

Whether or not the position obtained by adding the margin distance can be actually located at a boundary between the illumination region and the non-illumination region depends on an illumination performance of the headlamp 30. Therefore, in the control of the headlamp 30 as described below, if the illumination region and the non-illumination region having been set as described above cannot be formed, alternative approximate illumination region and non-illumination region which can be achieved by the headlamp 30, can be set as appropriate.

2-2. Control of Headlamp

When the illumination region and the non-illumination region have been set, light distribution control for the high beams is performed for the headlamp 30 by the headlamp control section 22 in order to emit high beams for the illumination region and the non-illumination region. In the following example, the light distribution control for the high beams is described by using an exemplary case where the lamp unit 31 of the headlamp 30 has a LED array structure in which a plurality of LED lamps are aligned in line.

Figure 5A:
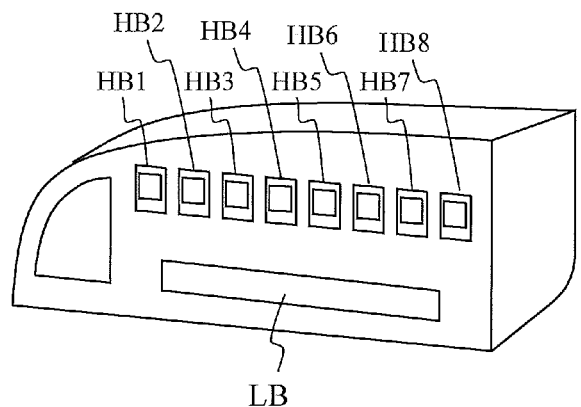
FIG. 5A illustrates an example of the headlamp, for a right front region, having a LED array structure.

FIG. 5A illustrates an example of the right front headlamp 30 (R) in the LED array structure in a simplified manner. The right front headlamp 30 (R) illustrated in FIG. 5A has, in the lamp unit 31, one lamp LB for the low beam emission, and eight LED lamps HB1 to HB8 for the high beam emission. Description of the left front headlamp 30 (L) is omitted.

Figure 5B:
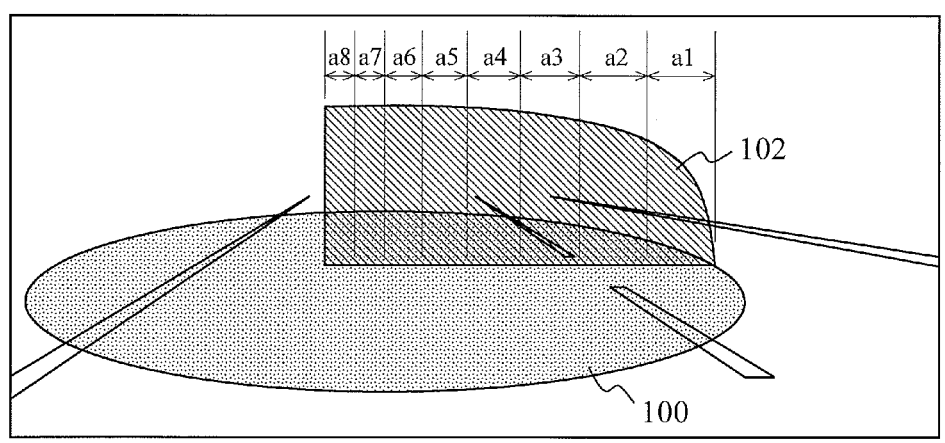
FIG. 5B illustrates an illumination region formed by the headlamp shown in FIG. 5A.

The lamp LB emits light to the illumination range 100 to which the low beams are emitted, as shown in FIG. 5B. The LED lamps HB1 to HB8 emit light to the illumination range 102 to which the high beams are emitted, as shown in FIG. 5B. The LED lamps HB1 to HB8 have different directivities, respectively, toward a light emitting direction, and can emit light toward respectively defined regions. In FIG. 5B, light can be emitted such that, for example, the LED lamp HB1 emits light to a region a1 and the LED lamp HB2 emits light to a region a2. That is, when the LED lamps HB1 to HB8 are extinguished, the corresponding regions cannot be illuminated by light (the corresponding regions can be shielded from light). In the example shown in FIG. 5B, regions which are illuminated by the LED lamps HB1 to HB8 do not overlap. However, the regions which are illuminated by the LED lamps HB1 to HB8 may overlap.

Figure 3A:
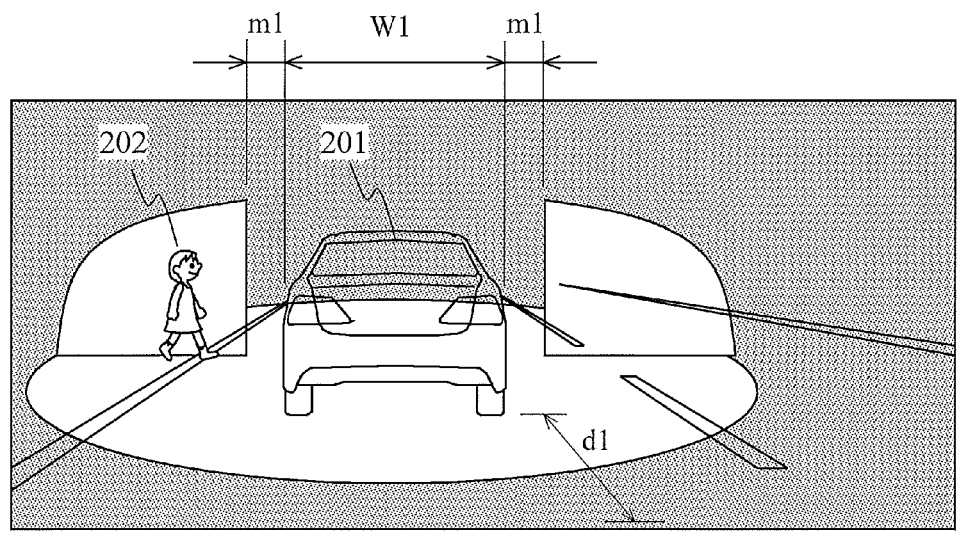
FIGS. 3A and 3B illustrate examples of an illumination region and a non-illumination region that are formed in light distribution control by the vehicle headlight control device according to the embodiment.
Figure 3B:
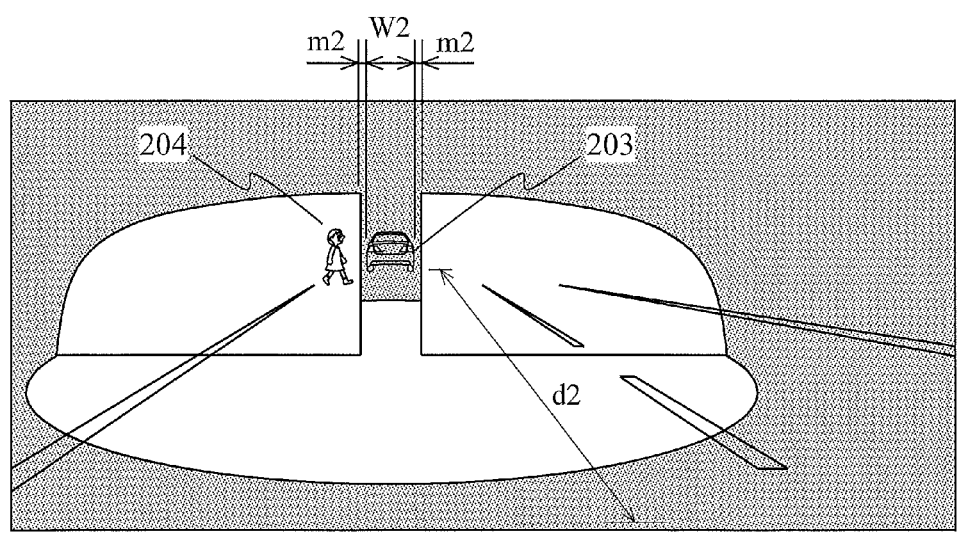
Figure 4:
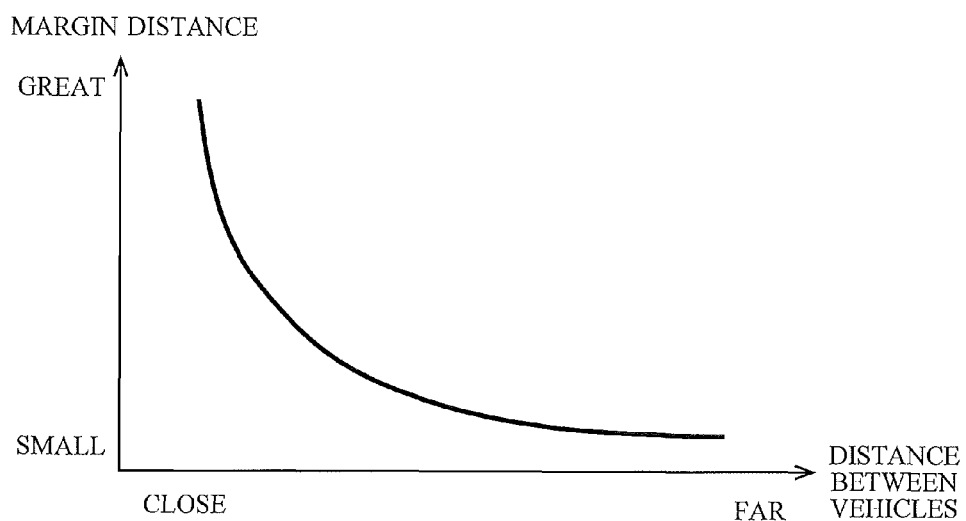
FIG. 4 illustrates an example of light distribution control characteristics representing association of a margin distance with a distance between vehicles.

For example, in a case where the illumination region and the non-illumination region shown in FIG. 3A are formed, the headlamp control section 22 instructs the headlamp 30 to light up the LED lamps HB1 to HB3, and to extinguish the LED lamps HB4 to HB8. Further, for example, when the illumination region and the non-illumination region shown in FIG. 3B are formed, the headlamp control section 22 instructs the headlamp 30 to light up the LED lamps HB1 to HB5 and to extinguish the LED lamps HB6 to HB8.

According to this instruction, only the illumination region can be illuminated by light of the headlamp 30 without illuminating the non-illumination region. Therefore, during driving at night, a field of view in front of the driver's vehicle can be enlarged and visibility in front of the driver's vehicle can be improved such that the driver of the forward vehicle does not feel uncomfortable glare.

As described above, whether or not a boundary between the illumination region and the non-illumination region as has been set can be formed, depends on illumination performance of the headlamp 30. Therefore, for example, in the above example shown in FIG. 3A, in a case where the LED lamps HB1 to HB5 are lit up, when the non-illumination region having been set is illuminated by light, the headlamp control section 22 may instruct the headlamp 30 to light up the LED lamps HB1 to HB4, and to extinguish the LED lamps HB5 to HB8.

2-3. Process Procedure of Light Distribution Control

Figure 6:
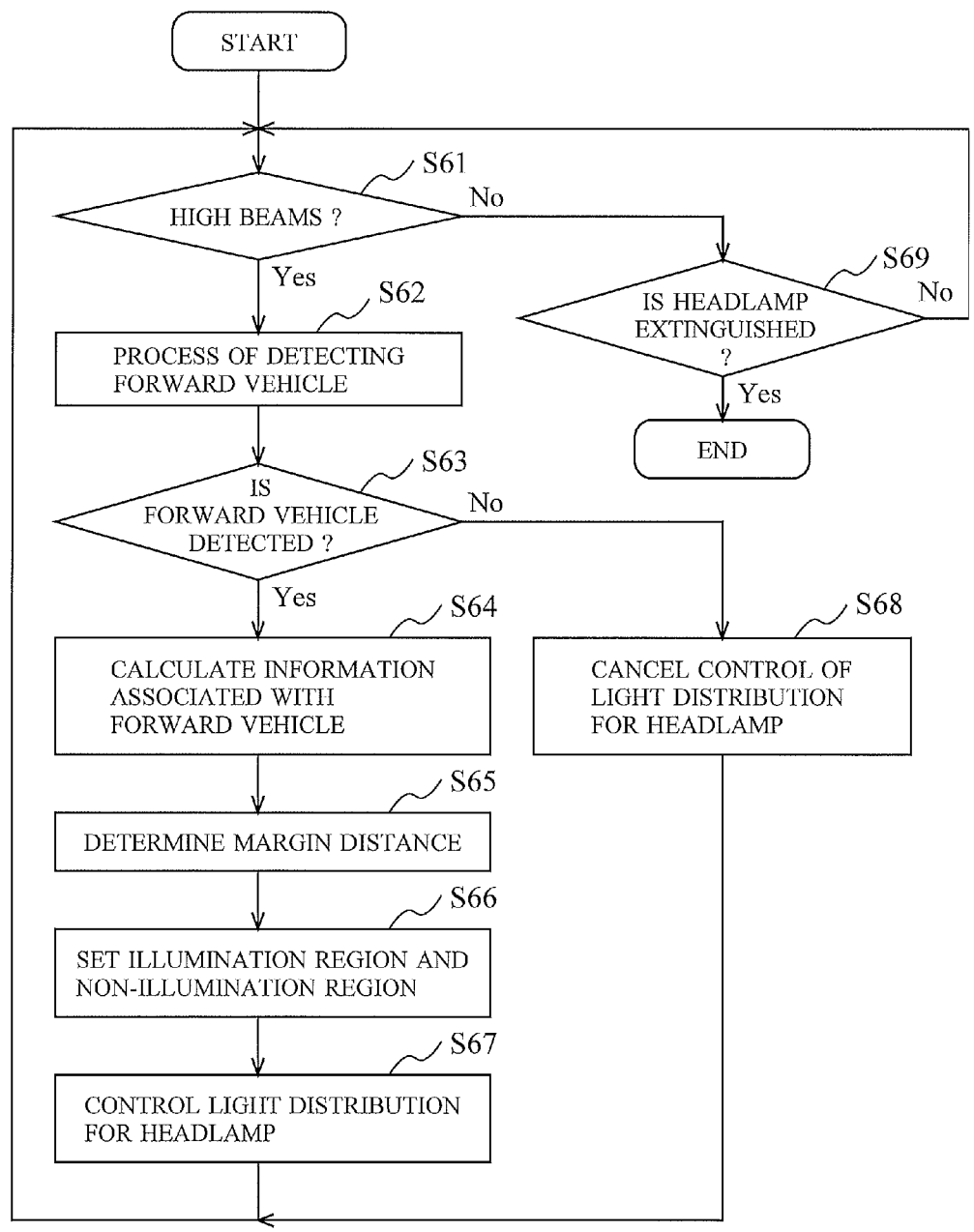
FIG. 6 is a flow chart showing an example of a process procedure of the light distribution control performed by the vehicle headlight control device according to the embodiment.

The light distribution control performed by the vehicle headlight control device 1 as described above will be described as a series of process procedure. FIG. 6 is a flow chart showing an example of a process procedure of the light distribution control performed by the vehicle headlight control device 1 according to one embodiment of the present invention. In the following process, an exemplary case where the light distribution control for the high beams starts when the headlamp 30 is lit up, will be described.

The process shown in FIG. 6 is started by an instruction for lighting up the headlamp 30 being inputted through an operation of the headlamp switch 40 by a driver. When the process is started, whether the instruction for lighting up the headlamp 30 is for lighting by high beams or lighting by low beams is determined (step S61). The present invention represents a technique for performing the light distribution control for a lamp during lighting by high beams. Therefore, no light distribution control for the headlamp 30 is performed while the headlamp 30 is lit up for low beam emission (step S61: No, step S69: No).

When the headlamp 30 is lit up for high beam emission (step S61: Yes), a process of detecting a forward vehicle is performed (step S62). When the forward vehicle is detected in the detection process (step S63: Yes), information associated with the forward vehicle is obtained (step S64). The information associated with the forward vehicle represents a position of the forward vehicle, a distance from the driver's vehicle to the forward vehicle, and/or the vehicle information of the forward vehicle. Meanwhile, in a case where the forward vehicle is not detected in the detection process of step S62 (step S63: No), when light distribution for high beams of the headlamp 30 has been controlled, the control is canceled, and the process is returned to step S61 (step S68). Next, the margin distance to be set from each of the left and the right lateral ends of the forward vehicle in the vehicle width direction is determined based on the obtained information associated with the forward vehicle (step S65). Next, the illumination region and the non-illumination region are set according to the determined margin distance (step S66). The light distribution for the high beams of the headlamp 30 is controlled based on the illumination region and the non-illumination region having been set (step S67). The above process steps are repeated until lighting by high beams is switched to lighting by low beams or the headlamp 30 is instructed to be extinguished.

Effect of Embodiment

In the vehicle headlight control device 1 according to the present embodiment described above, the light distribution control of the headlamp 30 is performed based on the distance from the driver's vehicle to the forward vehicle. In the light distribution control, the margin distance to be set from a boundary between the illumination region and the non-illumination region to the end of the body of the forward vehicle is changed according to the distance between the vehicles. More specifically, the margin distance is gradually reduced such that the greater the distance between the vehicles is, the less the margin distance is. Thus, in a case where the light distribution control is performed for the forward vehicle which is distant from the driver's vehicle during driving at night, a field of view in front of the driver's vehicle that is distant from the forward vehicle can be enlarged, and visibility in front of the driver's vehicle can be improved.

Further, in the light distribution control, an amount of light received by (a driver of) the forward vehicle due to illumination by the headlamp of the driver's vehicle is estimated, and the margin distance is determined such that the estimated amount of light becomes less than or equal to an amount of light in which an amount of glare is allowable. Thus, during driving at night, a field of view in front of the driver's vehicle that is distant from the forward vehicle can be enlarged, and visibility in front of the driver's vehicle can be improved such that the driver of the forward vehicle does not feel uncomfortable glare.

Application Example 1

In the above embodiment, the number of the forward vehicles having been detected is one. However, also when the vehicle headlight control device 1 according to the present invention has detected a plurality of forward vehicles, the process can be similarly performed. That is, for each of the forward vehicles having been detected, an amount of light received by the forward vehicle is estimated, the margin distance is determined, and the illumination region and the non-illumination region are set. In order to perform high beam emission for a region including a plurality of non-illumination regions that are set so as to correspond to the plurality of forward vehicles, the light distribution control for high beams of the headlamp 30 is performed.

Figure 7A:
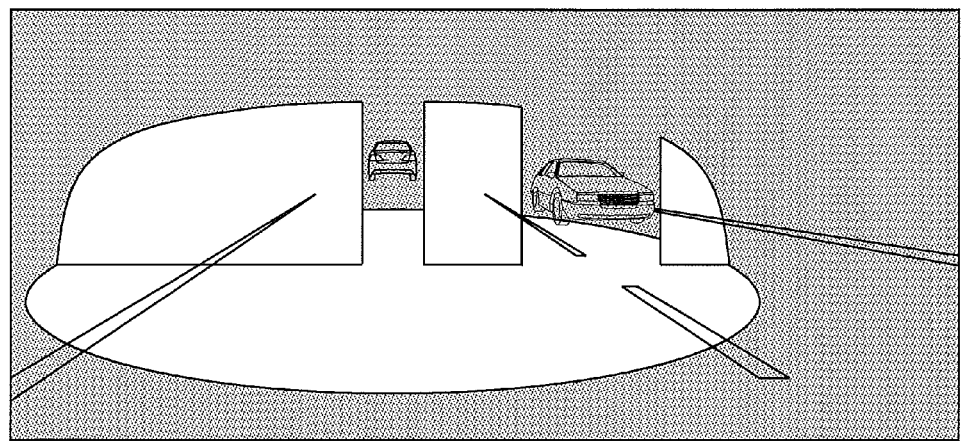
FIG. 7A illustrates examples of an illumination region and a non-illumination region according to application example 1.

For example, FIG. 7A illustrates an exemplary case where the high beam emission is performed for two forward vehicles. In order to form the illumination region and the non-illumination region as shown in FIG. 7A, for example, when the headlamp 30 as shown in FIG. 5A and FIG. 5B is used, the right front headlamp 30 (R) may be instructed to light up the LED lamps HB1, HB4, and HB5, and to extinguish the LED lamps HB2, HB3, and HB6 to HB8.

Application Example 2

In the above embodiment, the control for changing the margin distance that is set, for the forward vehicle having been detected, in the vehicle width direction from each of the left and the right lateral ends, is described. This control is performed on the assumption that the non-illumination region is set by the illumination region being divided so as to be slit-shaped. However, by arrangement of the lamps of the headlamp 30 being modified (for example, into two-dimensional arrangement), the non-illumination region can be also set without dividing the illumination region.

Figure 7B:
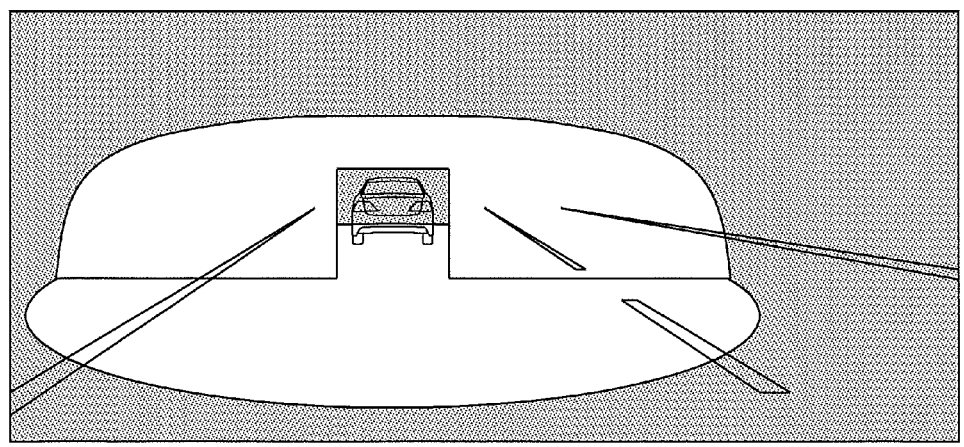
FIG. 7B illustrates examples of an illumination region and a non-illumination region according to application example 2.

For example, FIG. 7B illustrates an exemplary case where the illumination region is provided also on a roof of the forward vehicle. When such an illumination region is provided, visibility, in front of the driver's vehicle, for, for example, road signs and guide sign boards at high positions can be further improved. When the non-illumination region shown in FIG. 7B can be set, the margin distance to be set, for the forward vehicle having been detected, in the vehicle height direction from the upper side end may be changed. Further, the illumination region may be set also below the body of the forward vehicle.

Application Example 3

In the above embodiment, the control for setting the illumination region and the non-illumination region for the forward vehicle having been detected, is described. However, for example, a pedestrian and a person riding a bicycle may also feel uncomfortable glare. Therefore, the forward vehicle information obtaining section 10 may also detect, for example, a pedestrian or a bicycle, and set the non-illumination region in the head portion of the pedestrian or the person riding the bicycle.

While the invention has been described in detail, the foregoing description is in all aspects illustrative and not restrictive. It will be understood that numerous other modifications and variations can be devised without departing from the scope of the invention.

What is claimed is:

1. A vehicle headlight control device that controls a light distribution of headlight, the vehicle headlight control device comprising:

an obtaining section configured to obtain a position of a forward vehicle in front of a driver's vehicle, and a distance from the driver's vehicle to the forward vehicle; and a light distribution control section configured to change the light distribution of the headlight based on the position of the forward vehicle, and set an illumination region and a non-illumination region, the non-illumination region being provided in a vicinity of the forward vehicle so as to include the forward vehicle, the non-illumination region including a predetermined distance set from an end of a body of the forward vehicle, wherein the light distribution control section determines a ratio of a distance, in a vehicle width direction, between: a boundary between the illumination region and the non-illumination region; and each of left and right lateral ends of the forward vehicle, relative to a vehicle width of the forward vehicle, such that the greater the distance from the driver's vehicle to the forward vehicle is, the less the distance in the vehicle width direction is.

2. The vehicle headlight control device according to claim 1, wherein the light distribution control section determines the distance in the vehicle width direction such that an amount of light estimated to be received by the forward vehicle becomes less than or equal to an amount of light in which an amount of glare is allowable for the forward vehicle which is distant from the driver's vehicle.

3. The vehicle headlight control device according to claim 1, wherein
the obtaining section further obtains vehicle information indicating whether the forward vehicle is a preceding vehicle or an oncoming vehicle, and
the light distribution control section determines the distance in the vehicle width direction based further on the vehicle information.

4. The vehicle headlight control device according to claim 1, wherein
the obtaining section further obtains a relative positional deviation in the vehicle width direction between an axis of the driver's vehicle in a traveling direction and an axis of the forward vehicle in a traveling direction, and
the light distribution control section determines the distance in the vehicle width direction based further on the relative positional deviation therebetween.

5. The vehicle headlight control device according to claim 1, wherein the light distribution control section further determines a distance, in a vehicle height direction, between: a boundary between the illumination region and the non-illumination region; and each of upper and lower ends of the forward vehicle, such that the greater the distance from the driver's vehicle to the forward vehicle is, the less the distance in the vehicle height direction is.

6. The vehicle headlight control device according to claim 2, wherein
the obtaining section further obtains vehicle information indicating whether the forward vehicle is a preceding vehicle or an oncoming vehicle, and
the light distribution control section determines the distance in the vehicle width direction based further on the vehicle information.

7. The vehicle headlight control device according to claim 2, wherein
the obtaining section further obtains a relative positional deviation in the vehicle width direction between an axis of the driver's vehicle in a traveling direction and an axis of the forward vehicle in a traveling direction, and
the light distribution control section determines the distance in the vehicle width direction based further on the relative positional deviation therebetween.

8. The vehicle headlight control device according to claim 2, wherein the light distribution control section further determines a distance, in a vehicle height direction, between: a boundary between the illumination region and the non-illumination region; and each of upper and lower ends of the forward vehicle, such that the greater the distance from the driver's vehicle to the forward vehicle is, the less the distance in the vehicle height direction is.

* * * * *